(12) United States Patent
Yamada et al.

(10) Patent No.: US 6,952,288 B2
(45) Date of Patent: Oct. 4, 2005

(54) IMAGE PROCESSING METHOD AND APPARATUS, AND RECORDING MEDIUM USED THEREWITH

(75) Inventors: Osamu Yamada, Tokyo (JP); Atsushi Ushiroda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 09/923,416

(22) Filed: Aug. 8, 2001

(65) Prior Publication Data

US 2002/0044292 A1 Apr. 18, 2002

(30) Foreign Application Priority Data

Aug. 31, 2000 (JP) ........................................ 2000-263151

(51) Int. Cl.[7] ................................................ G06K 1/00
(52) U.S. Cl. ........................ 358/1.9; 358/3.01; 358/406; 382/274
(58) Field of Search ........................... 358/1.1, 1.9, 2.1, 358/3.01, 521, 406, 504; 382/254, 274

(56) References Cited

U.S. PATENT DOCUMENTS

| | | | | |
|---|---|---|---|---|
| 5,345,315 A | * | 9/1994 | Shalit | 358/406 |
| 5,608,549 A | | 3/1997 | Usami | 358/530 |
| 6,067,406 A | * | 5/2000 | Van Hoof et al. | 358/1.9 |
| 6,184,915 B1 | | 2/2001 | Atsumi et al. | 347/251 |

* cited by examiner

*Primary Examiner*—Thomas D. Lee
(74) *Attorney, Agent, or Firm*—Fitzpatrick, Cella, Harper & Scinto

(57) ABSTRACT

An image processing method matches the gradations of a first output unit and a second output unit which have different gradation-reproduction ranges. The image processing method sets first-output-unit information on the first output unit, sets output-medium information for use in the second output unit, and finds an output-gradation reproduction curve from the first-output-unit information and the output-medium information.

5 Claims, 17 Drawing Sheets

IMAGE PROCESSING METHOD AND APPARATUS, AND RECORDING MEDIUM USED THEREWITH

BACKGROUND OF THE INVENTION

1. Field of the Invention

The present invention relates to an image processing method and apparatus that perform gradation matching between images formed by a first output unit and a second output unit which have different gradation reproduction ranges, and a recording medium used therewith.

2. Description of the Related Art

Conventionally, when a computer system, or the like, uses a printer to print an image displayed on a monitor, control of the lightness of an output image is performed using settings concerning lightness or an output gamma value in a printer driver. The printer driver corrects image data by using a gradation correction curve in accordance with set lightness or the output gamma value.

However, settings for the monitor cannot be reflected when the gradation correction curve for the printer is set. Also, the gradation correction curve for the printer is set without considering the relationship between a gradation correction curve outputtable by the monitor and a gradation correction curve outputtable by the printer.

Accordingly, these cause problems in that an image output by the printer is too bright or too dark than an image displayed on the monitor and in that part of the output image is too bright to be visible, or part of the output image is too dark for the gradation of the part to be perceptible.

In addition, conventionally, when the computer, or the like, uses the printer to print the image displayed on the monitor, control of the lightness or contrast of the image output by the printer is performed by changing lightness and contrast values in settings for the printer driver. The printer driver controls output lightness and contrast by using the set values to calculate the gradation correction curve, and correcting image data.

In the above conventional cases, regardless of gradation characteristics reproduced by the monitor, a gradation curve for output is set and output by lightness-change processing such as entirely brightening or darkening, or performing contrast-change processing such as increasing or reducing the inclination of the gradation curve.

Accordingly, this causes problems in that an image output by the printer is too bright or too dark, and in that too dark portions, too bright portions, etc., appear.

SUMMARY OF THE INVENTION

Accordingly, to solve the foregoing problems, it is an object of the present invention to provide an image processing method and apparatus for matching the gradation of images output by different output units, and a recording medium used therewith.

It is another object of the present invention to provide an image processing method and apparatus that can preferably output images, even if lightness or contrast is controlled, and a recording medium used therewith.

It is a further object of the present invention to provide an image processing method and apparatus that can provide a preferably output image in accordance with a change in reproduction characteristics of an output apparatus, and a recording medium used therewith.

To these ends, according to an aspect of the present invention, there is provided an image processing method for performing gradation matching between images formed by a first output unit and a second output unit which have different gradation-reproduction ranges. The image processing method includes the steps of setting first-output-unit information on the first output unit, setting output-medium information for use in the second output unit, and finding an output-gradation reproduction curve from the first-output-unit information and the output-medium information.

According to another aspect of the present invention, there is provided an image processing method for performing gradation matching between images formed by a first output unit and a second output unit which have different gradation-reproduction ranges, wherein a lightness changing process by the second output unit is operatively associated with the gradation-reproduction range of the second output unit, and a contrast changing process by the second output unit is operatively associated with the gradation-characteristic curve of the first output unit.

According to another aspect of the present invention, there is provided an image processing method for performing gradation matching between images formed by a first output unit and a second output unit which have different gradation-reproduction ranges. The image processing method includes the steps of controlling the first output unit to output a gradation image in accordance with image data representing gradation, controlling the second output unit to output a plurality of gradation images corresponding to the results of different gradation processes on the image data representing gradation, inputting information for, from among the plurality of gradation images output from the second output unit, selecting a gradation image corresponding to the gradation image output from the first output unit, and setting gradation conversion conditions for the second output unit by using the selected gradation image as a target.

According to another aspect of the present invention, there is provided an image processing apparatus for performing gradation matching between images formed by a first output unit and a second output unit which have different gradation-reproduction ranges. The image processing apparatus includes a setting unit for setting first-output-unit information on the first output unit, a setting unit for setting output-medium information for use in the second output unit, and a finding unit for finding an output-gradation reproduction curve from the first-output-unit information and the output-medium information.

According to another aspect of the present invention, there is provided an image processing apparatus for performing gradation matching between images formed by a first output unit and a second output unit which have different gradation-reproduction ranges. The image processing apparatus includes an associating unit for operatively associating a lightness changing process performed by the second output unit with the gradation-reproduction range of the second output unit, and an associating unit for operatively associating a contrast changing process performed by the second output unit with the gradation-characteristic curve of the first output unit.

According to another aspect of the present invention, there is provided an image processing apparatus for performing gradation matching between images formed by a first output unit and a second output unit which have different gradation-reproduction ranges. The image processing apparatus includes a control unit for controlling the first output unit to output a gradation image in accordance with image data representing gradation, a control unit for controlling the second output unit to output a plurality of gradation images corresponding to the results of different gradation processes on the image data representing gradation, an input unit for inputting information for, from among the plurality of gradation images output from the second output unit, selecting a gradation image corresponding to the gradation image output from the first output unit, and a setting unit for setting gradation conversion conditions for the second output unit by using the selected gradation image as a target.

According to a further aspect of the present invention, there is provided a recording medium containing a program for implementing an image processing method for performing gradation matching between images formed by a first output unit and a second output unit which have different gradation-reproduction ranges, wherein the program includes the steps of setting first-output-unit information on the first output unit, setting output-medium information for use in the second output unit, and finding an output-gradation reproduction curve from the first-output-unit information and the output-medium information.

According to a further aspect of the present invention, there is provided a recording medium containing a program for implementing an image processing method for performing gradation matching between images formed by a first output unit and a second output unit which have different gradation-reproduction ranges, wherein the program includes the steps of operatively associating a lightness changing process performed by the second output unit with the gradation-reproduction range of the second output unit, and operatively associating a contrast changing process performed by the second output unit with the gradation-characteristic curve of the first output unit.

According to a further aspect of the present invention, there is provided a recording medium containing a program for implementing an image processing method for performing gradation matching between images formed by a first output unit and a second output unit which have different gradation-reproduction ranges, wherein the program includes the steps of controlling the first output unit to output a gradation image in accordance with image data representing gradation, controlling the second output unit to output a plurality of gradation images corresponding to the results of different gradation processes on the image data representing gradation, inputting information for, from among the plurality of gradation images output from the second output unit, selecting a gradation image corresponding to the gradation image output from the first output unit, and setting gradation conversion conditions for the second output unit by using the selected gradation image as a target.

Further objects, features and advantages of the present invention will become apparent from the following description of the preferred embodiments with reference to the attached drawings.

DESCRIPTION OF THE PREFERRED EMBODIMENTS

With reference to the accompanying drawings, embodiments of the present invention are described below.

First Embodiment

Figure 1:
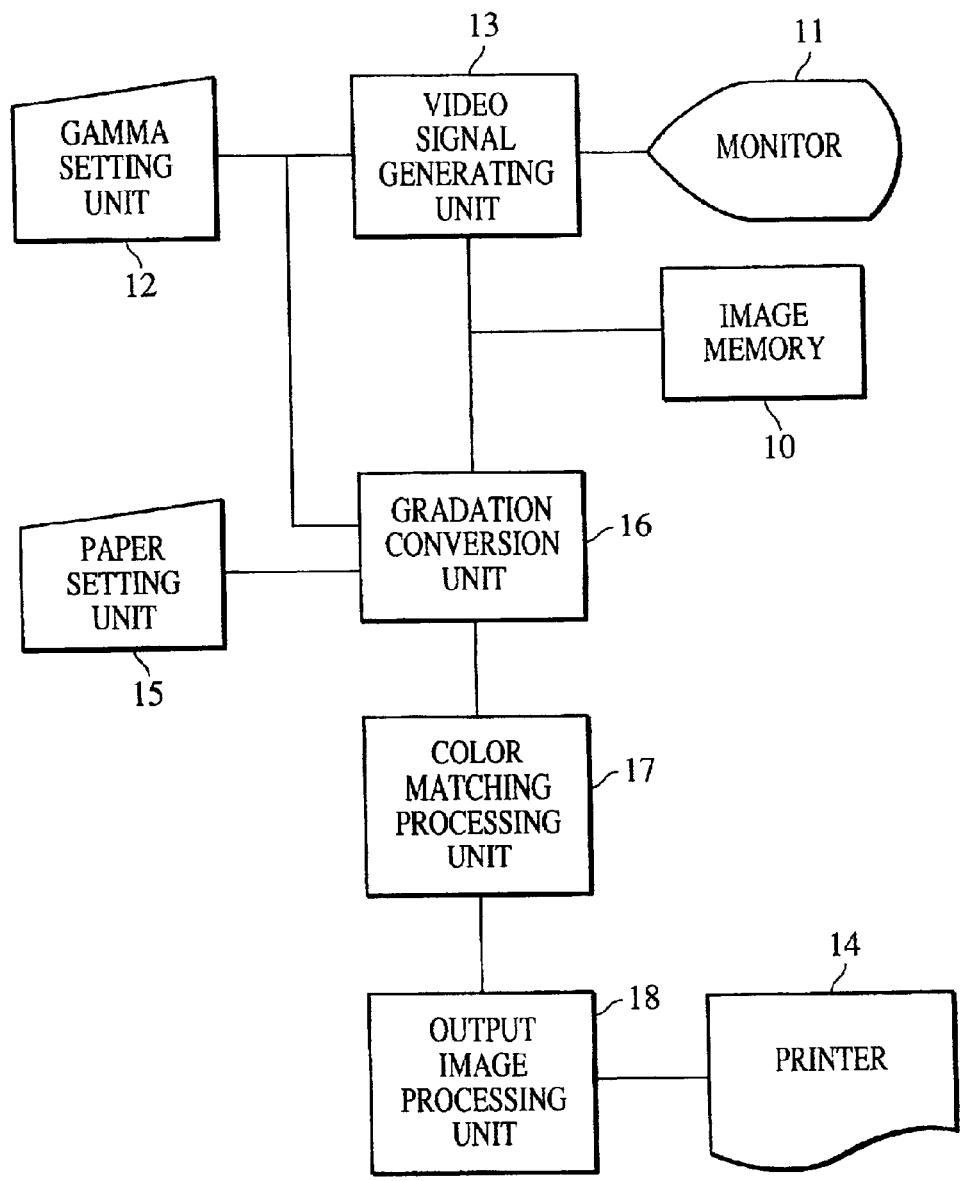
FIG. 1 is a block diagram showing an image processing apparatus according to a first embodiment of the present invention.

FIG. 1 is a block diagram showing an image processing apparatus according to a first embodiment of the present invention. This image processing apparatus includes an image memory 10 for storing image data, a monitor 11 for displaying an image, a gamma setting unit 12 for setting display characteristics, a video signal generating unit 13 for using a set gamma value to convert the image data into a video signal, a printer 14 for printing an image, a paper setting unit 15 for setting a printing paper type, a gradation conversion unit 16 for performing gradation matching between the image displayed on the monitor 11 and the image printed by the printer 14, a color matching processing unit 17 for performing color matching between the image displayed on the monitor 11 and the image printed by the printer 14, and an output image processing unit 18 for converting the image data into a printer driving signal.

The image data specifically includes data digitized by a device such as a digital camera or a scanner and data generated by computer graphics. The image data is stored, as pixel levels corresponding to lightness, in the image memory 10. Each pixel level is represented by the 8-bit values of red (R), green (G), and blue (B). Value 255 represents a maximum lightness and value 0 represents a minimum lightness.

The monitor 11 is a display such as a cathode-ray tube or a liquid crystal display. In the monitor 11, with respect to the intensity V of a driving signal, luminance signal Y has a substantial relationship as expressed by the following expression (1):

$$Y = V^{\gamma_{monitor}} \tag{1}$$

The video signal generating unit 13 uses a digital-to-analog converter (DAC) to generate video driving signal V corresponding to pixel level I. Assuming that the input/output characteristics of the DAC are given by the following expression (2):

$$V = (I/255)^{1/\gamma_{video}} \tag{2}$$

luminance value Y displayed on the monitor 11 and pixel level I has a relationship as expressed by the following expression (3):

$$V = (I/255)^{\gamma_{monitor}/\gamma_{video}} = (I/255)^{\gamma} \tag{3}$$

In the first embodiment, the input/output characteristics of the DAC of the video signal generating unit 13 are controlled so that the relationship between luminance value Y displayed on the monitor 11 and pixel level I is represented by gamma value γ.

The printer 14 is an ink-jet type in which, by discharging and fixing droplets of cyan (C), magenta (M), yellow (Y), and black (K) inks on printing paper, the gradation of each is indicated by the density of the droplets.

In accordance with input RGB pixel levels, the output image processing unit 18 generates data for controlling discharge of C, M, Y, and K inks in order to reproduce desired color on the paper.

In the printer 14, a type of paper can be selected from among paper types such as plain paper, coated paper, and glossy paper, and the type of paper can be designated by the paper setting unit 15.

The gradation conversion unit 16 performs gradation conversion in accordance with gamma value setting and settings on the paper so as to perform gradation matching on the image displayed on the monitor 11.

A method of setting gradation conversion conditions for use in the gradation conversion unit 16 is described below.

The relationship between pixel levels and output color can be found by the following procedure. Without performing gradation conversion, gray patches obtained by changing pixel level (R, G, B) from (0, 0, 0) to (255, 255, 255) are output onto a type of paper. The color of each gray patch is measured using a calorimeter, and relative reflection factor R is found, with the paper plane used as a reference (reflection 1). Relative reflection factor R is converted into lightness L* by using the following expression (4):

$$L^* = 116^{1/3} - 16 \quad (R > 0.008856)$$

$$L^* = 903.29R \quad (R \leq 0.008856) \tag{4}$$

The relationship between pixel level I and the found lightness L* is the relationship between the pixel level and the output color.

Figure 2:
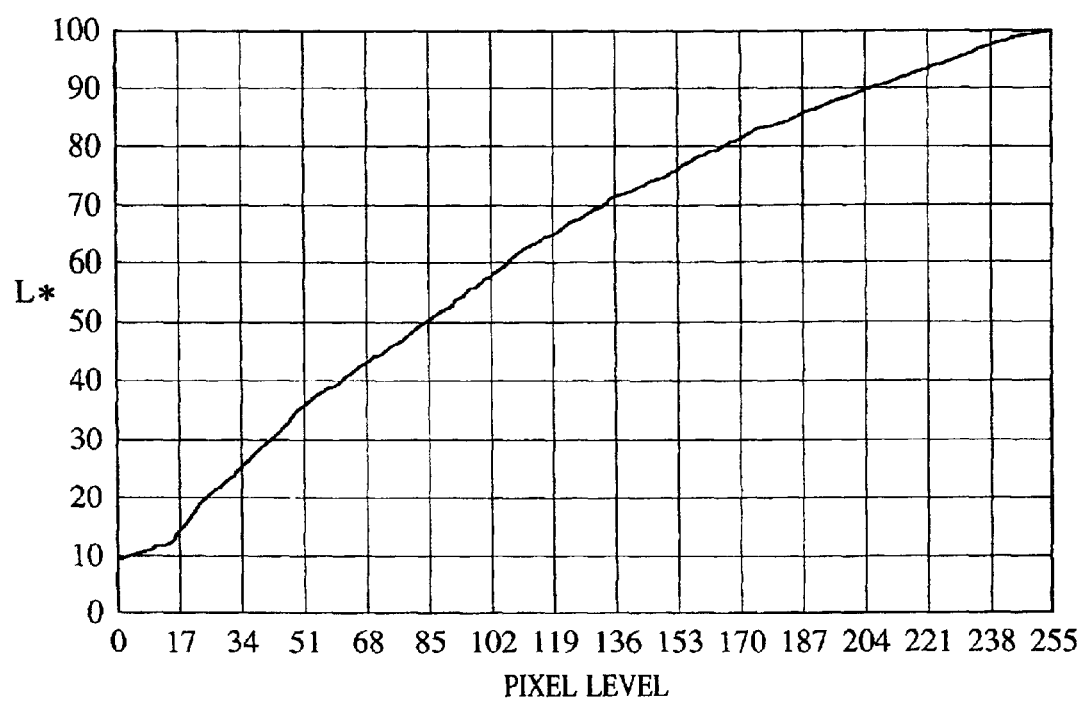
FIG. 2 is a graph showing an example of printing gradation characteristics.

In FIG. 2, an example of a relationship between pixel level I and (printing) lightness L* is shown.

The relationship between pixel level I and lightness $L_m^*$ is expressed based on gamma value γ (of the monitor 11) by the following expression (5):

$$L_{m^*} = 116(Y/Y0)^{1/3} - 16 \quad (Y/Y0 > 0.008856) \tag{5}$$

$$= 116(I/255)^{\gamma/3} - 16$$

$$L_{m^*} = 903.29(Y/Y0) \quad (Y/Y0 \leq 0.008856)$$

$$= 903.29(I/255)^{\gamma}$$

Figure 3:
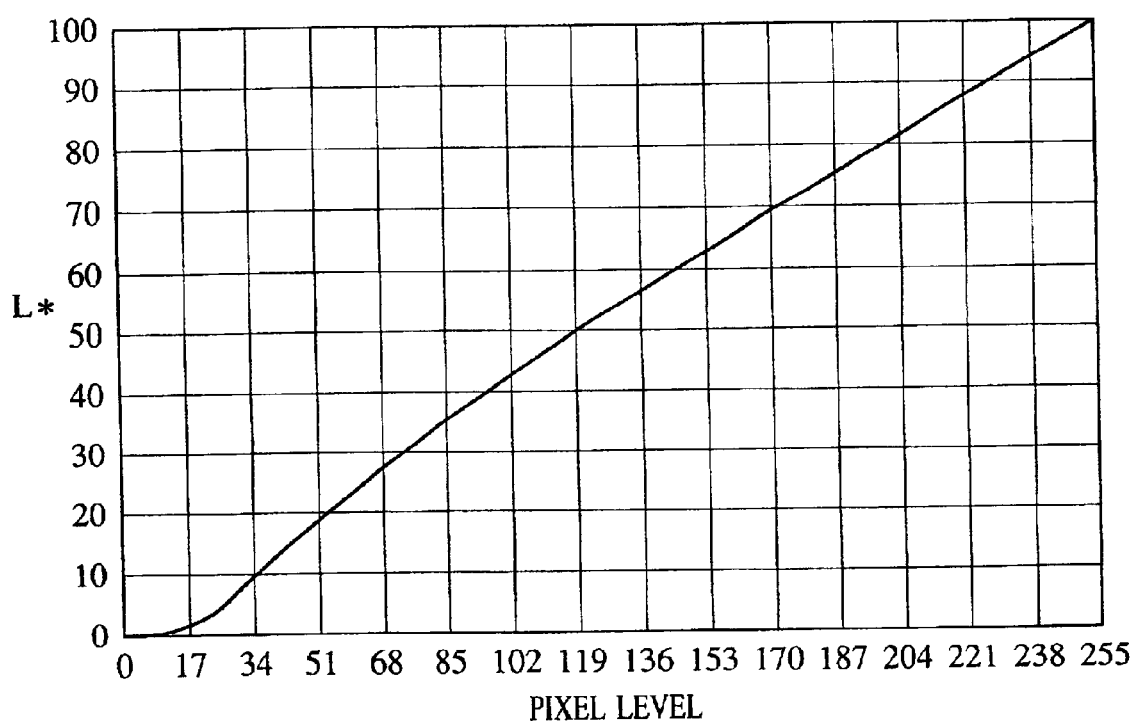
FIG. 3 is a graph showing an example of display gradation characteristics.

In expression (5), Y0 represents the maximum luminance of the monitor 11. $L_m^*$ represents lightness displayed on the monitor 11. In FIG. 3, the relationship between pixel level I and display lightness L* which are obtained when γ=2.2 is shown.

From FIGS. 2 and 3, it is understood that the monitor 11 and the printer 14 has different displayable ranges: the monitor 11 has a displayable range of lightness from 0 to 100, while the printer 14 has a displayable range of lightness from 10 to 100.

Accordingly, in order to obtain a printed output which is matched with an image displayed on the monitor 11, lightness must be compressed. In the first embodiment, the displayable range of lightness is linearly compressed into a printable range of lightness. Specifically, the conversion expressed by the following expression (6) is performed:

$$L_p^* = L_m^*(L_{max} - L_{min}) + L_{min} \tag{6}$$

where $L_{max}$ represents a maximum printable lightness, $L_{min}$ represents a minimum printable lightness, and $L_p^*$ represents a printed lightness.

Figure 4:
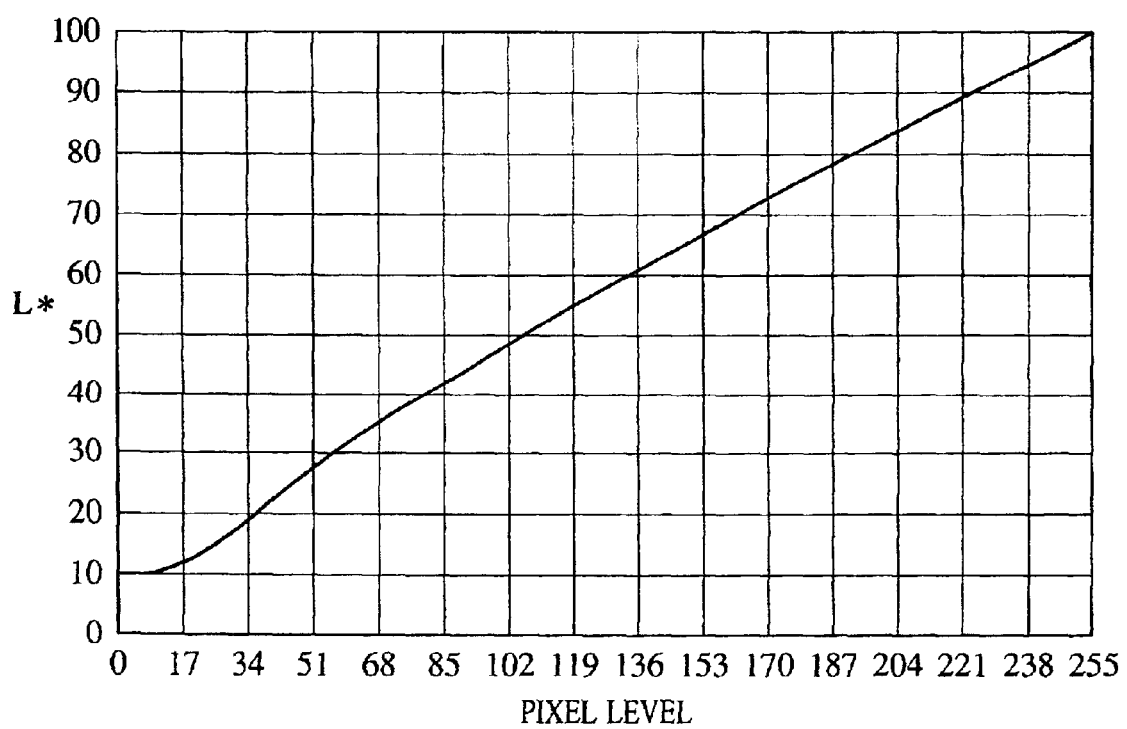
FIG. 4 is a graph showing gradation characteristics obtained when lightness compression is performed.

In FIG. 4, the relationship between lightness $L_p^*$ obtained by lightness compression and pixel level I is shown.

In order to obtain the output gradation characteristics shown in FIG. 4, the gradation conversion conditions are found in the following manner.

First, concerning sixteen gradations in which the pixel level of each of R, G, and B is 0, 17, 34, 51, 68, 85, 102, 119, 136, 153, 170, 187, 204, 221, 238, and 255, input values for outputting the lightness shown in FIG. 4 are found from FIG. 2.

By way of example, it is found from FIG. 4 that objective lightness corresponding to pixel level 17 is 12. Also, FIG. 2 indicates that pixel level 9 needs to be set for outputting lightness 12. Thus, after converting input pixel level 17 into 9, the gradation conversion unit 16 needs to output the value 9 converted from the input level 17.

Next, converted values corresponding to pixel levels 0 to 255 are found from the above obtained sixteen gradations by using interpolation. Although the interpolation is linear interpolation, it is preferable to use smooth interpolation such as spline. Also, by setting the precision of interpolation calculation to eight bits or greater, an interpolation-caused loss of gradation can be prevented.

This process can create gradation conversion conditions capable of reproducing the gradation characteristics in FIG. 4. The gradation conversion unit 16 uses the gradation conversion conditions in common for RGB color components.

Figure 5:
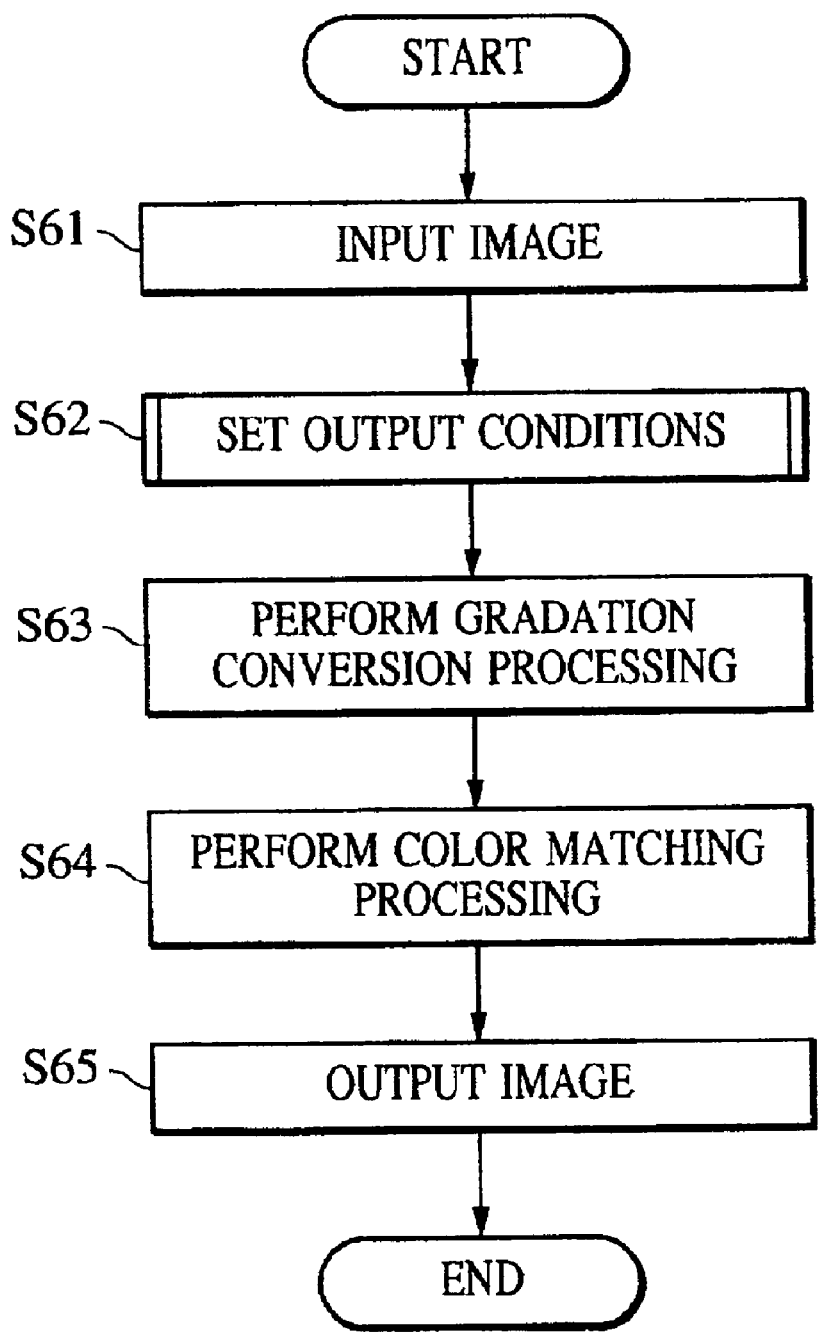
FIG. 5 is a flowchart illustrating an image output process.

With reference to the flowchart shown in FIG. 5, a process for outputting an image by the printer 14 is described below.

In step S61, an image is input to the image memory 10.

In step S62, output conditions are set, such as reading and setting of gamma value γ (for the monitor 11) which is used by gradation matching, and the setting of the paper type in the paper setting unit 15.

In step S63, based on the output conditions set in step S62, the gradation conversion unit 16 performs gradation conversion processing using the gradation conversion conditions obtained by the above interpolation and expressions (5) and (6).

In step S64, color matching processing is performed by the color matching processing unit 17, and in step S65, an image output by the color matching processing 17 is transferred to the printer 14 by the output image processing unit 18.

Next, the setting of the output conditions in step S62 is described below with reference to FIGS. 6 and 7.

Figure 6:
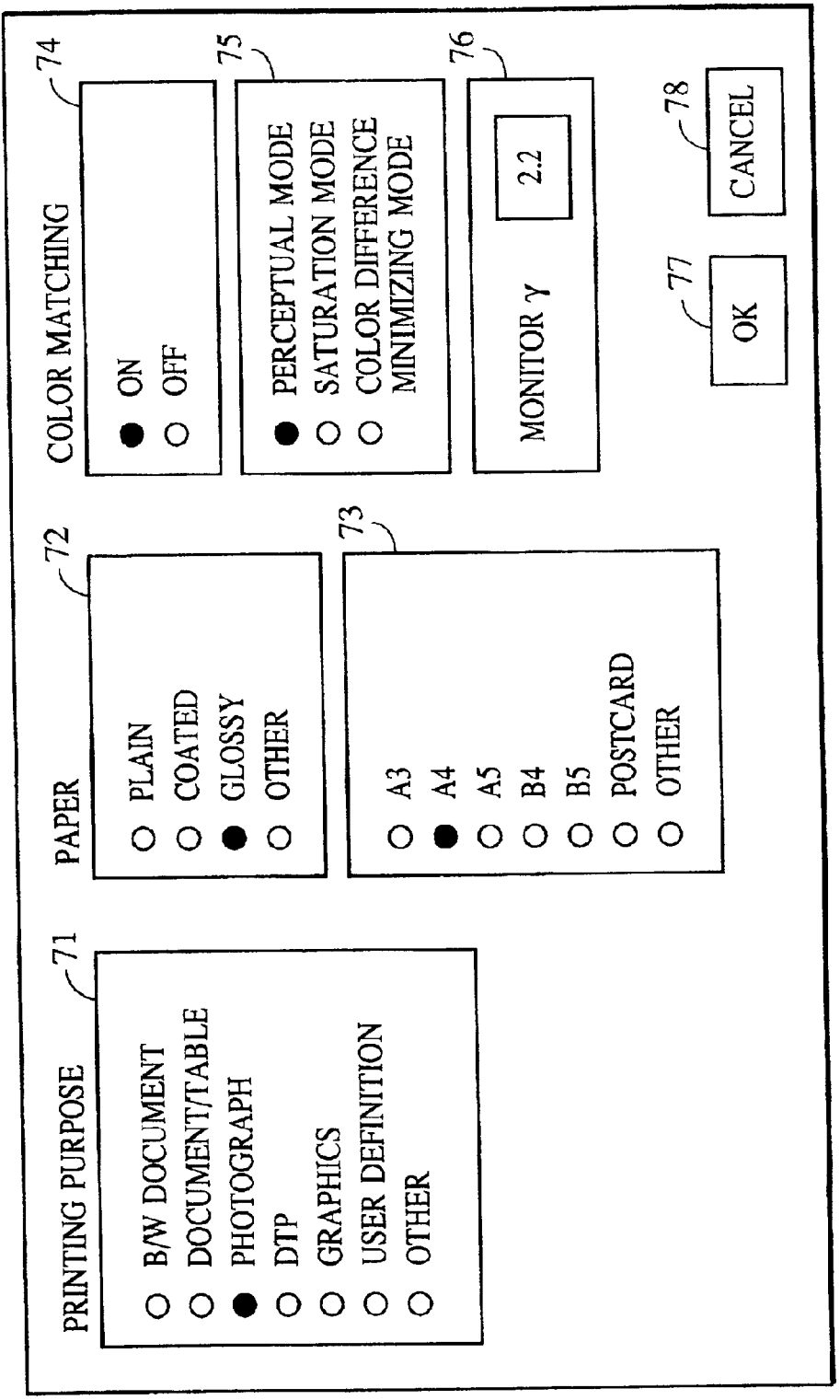
FIG. 6 is a drawing showing an example of a user interface for setting image-output conditions.
Figure 7:
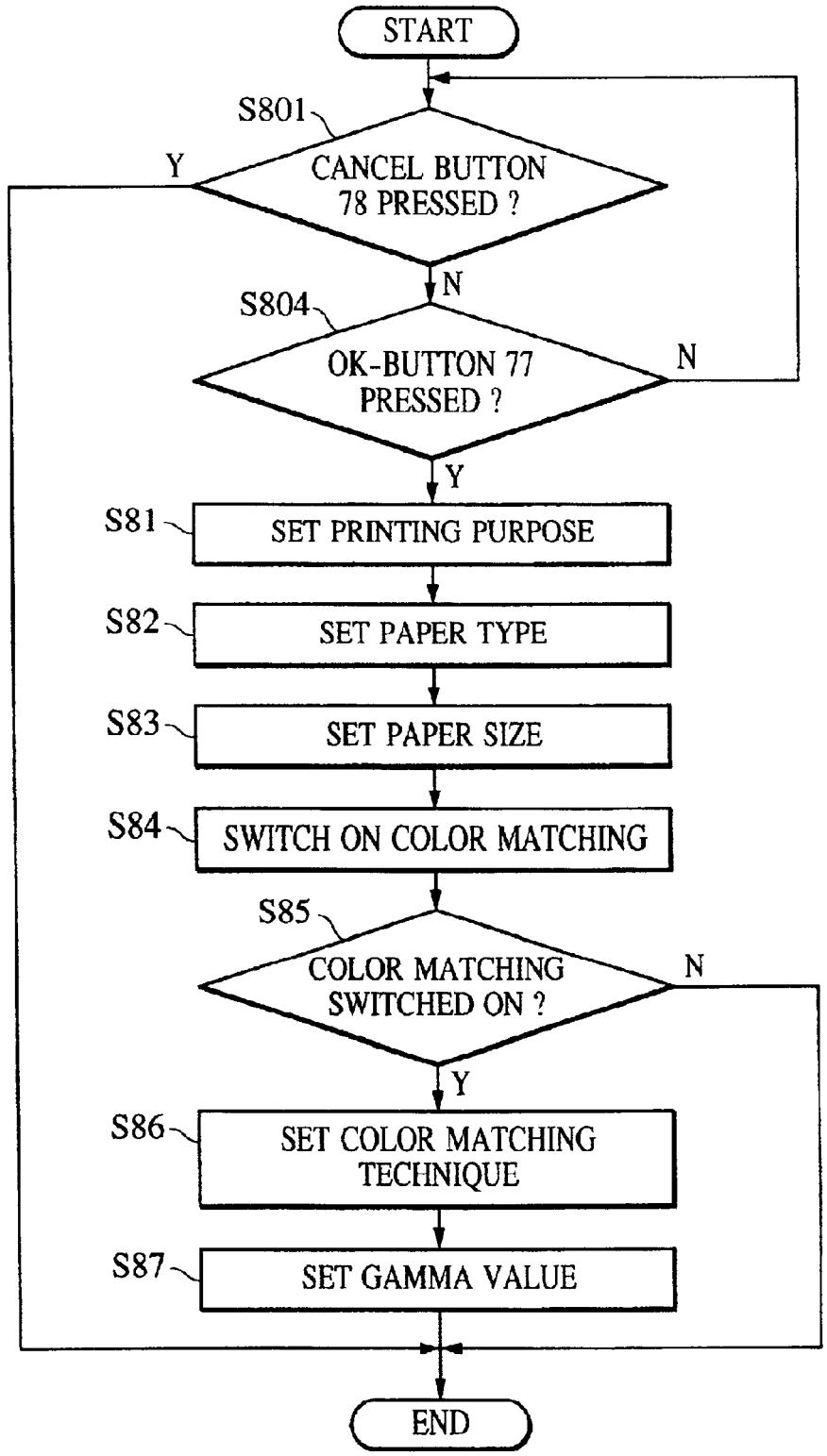
FIG. 7 is a flowchart illustrating a process for setting image-output conditions.

FIG. 6 shows an example of a user interface in the printer driver. When outputting an image, the user sets the items of the interface to match desired output conditions, and subsequently presses an OK button 77. This completes the setting of the output conditions, and the output image can be obtained. The interface contains a printing purpose setting unit 71 for setting an image printing purpose, a paper type setting unit 72 for setting a paper type for use in printing, a paper size setting unit 73 for setting the size of paper for use in printing, a color matching setting unit 74 for setting the determination of whether color matching processing is performed on an image to be output, a color-matching-technique setting unit 75 for setting a color matching type, an objective gamma setting unit 76 for setting gamma value $\gamma_p$ as a matching target, the OK button 77 for confirming completion of all settings, and a cancel button 78 for aborting a setting operation.

With reference to the flowchart in FIG. 7, a process for setting the output conditions in step S62 (FIG. 5) is described below in which the user interface in FIG. 6 is used to determine each setting item.

In step S801, the process determines whether the cancel button 78 is pressed. If the cancel button 78 is pressed, the setting of the output conditions in step S62 is terminated. If the cancel button 78 is not pressed, the process proceeds to step S802.

In step S804, the process determines whether the OK button 77 is pressed. If the OK button 77 is pressed, the process proceeds to step S81. If the OK button 77 is not pressed, the process goes back to step S801.

In step S81, by using the printing purpose setting unit 71 to selectively set a printing purpose, printing purpose information is acquired, such as black and white (B/W) document, document/table, photograph, desktop publishing (DTP), graphics, user definition, or other.

In step S82, by using the paper type setting unit 72 to set a paper type, from among a plurality of paper types such as plain paper, coated paper, and glossy paper, information on the type of paper is acquired. The gradation conversion condition is set by using the relationship between pixel level I and printing lightness $L^*$, which corresponds to the acquired information on the type of paper.

In step S83, by using the paper size setting unit 73 to set a paper size, information on a paper size, such as A3, A4, A5, B4, B5, postcard, or other, is acquired.

In step S84, by using the color matching setting unit 74 to switch on color matching, ON/OFF information on the color matching processing is acquired.

In step S85, based on the information acquired in step S84, if the color matching processing has been switched on in step S84, the process proceeds to step S86, or if the color matching processing has not been switched on in step S84, the process terminates the output condition process.

In step S86, by using the color-matching-technique setting unit 75 to set a color matching technique, information on a technique, such as perceptual mode, saturation mode, or color difference minimizing mode, is acquired.

In step S87, by using the objective gamma setting unit 76, gamma value $\gamma_p$ on the monitor 11 for which gradation matching is performed is acquired. Here, the gamma value $\gamma$ set in the gamma setting unit 12 is set as an initial value in the objective gamma setting unit 76, so that the initial value can be changed depending on user's preference. The gradation conversion condition is set by using the relationship between pixel level I and printing lightness $L_m^*$, which corresponds to the set gamma value $\gamma$.

The above-described process sets the output conditions.

As described above, based on the relationship between pixel level I and printing lightness $L_m^*$, which corresponds to the set gamma value $\gamma$, and on the relationship between pixel level I and printing lightness $L^*$, which corresponds to the acquired information on the type of paper, by finding the relationship between each pixel level and each correction value, printing that is matched with an image displayed on the monitor 11 in gradation can be performed. In particular, by linearly compressing the gradation reproduction range of the monitor 11 and the printing paper by using lightness that is an equal factor with respect to a human sense of luminous intensity, visually preferable gradation reproduction can be performed.

In the first embodiment, in the described interpolation of the output gradation characteristics, conversion values corresponding to pixel levels from 0 to 255 are found from sixteen gradations. However, obviously, the number of gradations is not limited to the sixteen gradations, and may be changed to 32 gradations, depending on the memory capacity and conversion precision required for practice.

In the first embodiment, as described above, the gradation conversion process is performed, as the gradation conversion process in the gradation conversion unit 16, such that whenever an image is output, the output gradation characteristics are calculated based on expressions (5) and (6) and the interpolation processing. However, the gradation conversion process is not limited thereto. By storing beforehand, in a memory, output gradation characteristics calculated based on typical combinations of gamma value $\gamma$ and paper types, the output gradation characteristics may be read from the memory when an image is output.

The user interface shown in FIG. 6 has a form in which selection is made by the buttons. However, obviously, the user interface shown in FIG. 6 is not limited to the form. Also, a user interface form may be used in which a keyword can be directly input. In other words, the user interface shown in FIG. 6 may have a form in which output conditions desired by the user can be set.

Second Embodiment

A second embodiment of the present invention is a modification of the first embodiment. Differences from the first embodiment are described below.

Figure 8:
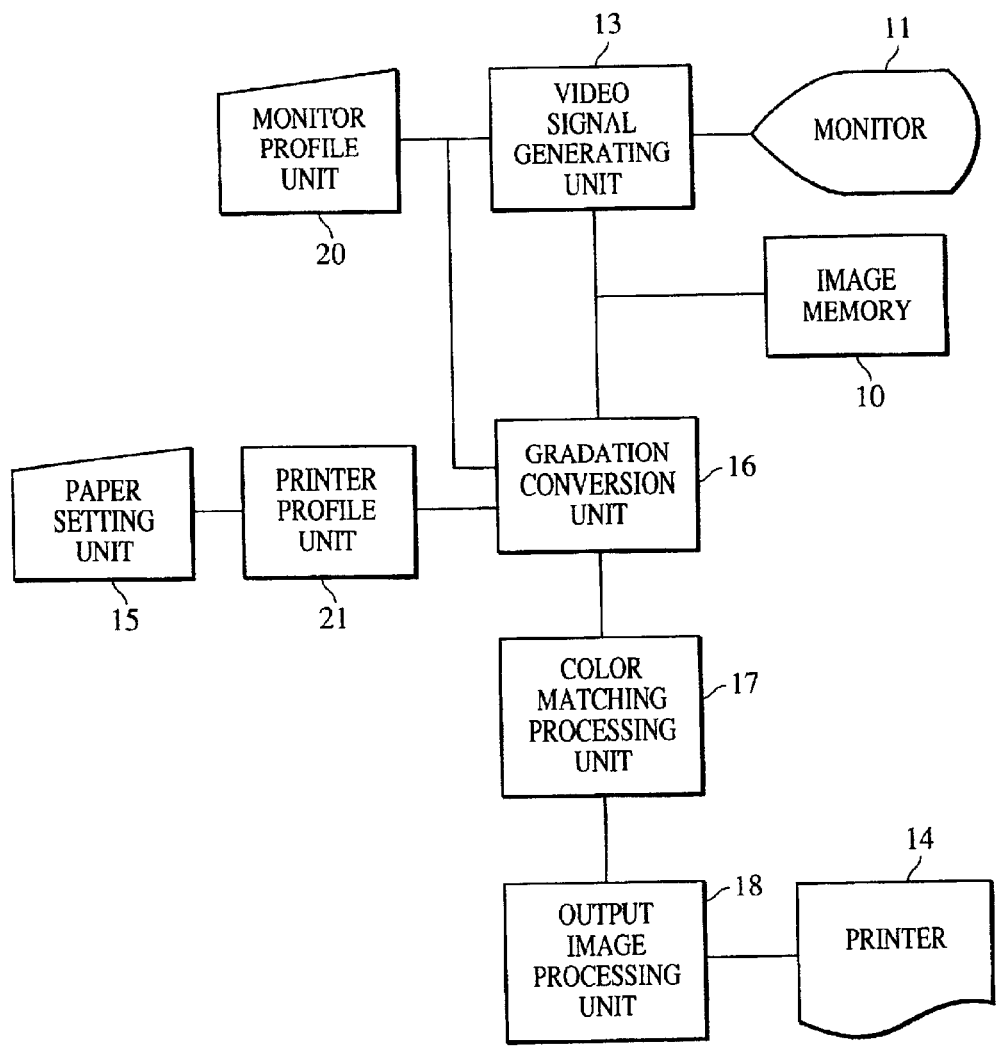
FIG. 8 is a block diagram showing an image processing apparatus according to a second embodiment of the present invention.

FIG. 8 is a block diagram showing an image processing apparatus according to the second embodiment.

The image processing apparatus according to the second embodiment includes a monitor profile unit 20 and a printer profile unit 21 that stores output characteristics for each type of paper.

In the monitor profile unit 20, gamma value $\gamma$ on the monitor 11 and RGB chromaticity of fluorescent material are described. In the printer profile unit 21, the $L_{ab}$ values and output gradation characteristics of print colors corresponding to input pixel levels for each type of paper are described. General methods for describing these device characteristics include the International Color Consortium (ICC) Profile.

In the image processing apparatus according to the second embodiment, gamma value γ on the monitor 11 is read from the monitor profile unit 20, the relationship between the input pixel level and displayed lightness is found, maximum lightness $L_{max}$ and minimum lightness $L_{min}$ on the presently set paper are read from the printer profile unit 21, and compressed output lightness $L^{*'}$ obtained by expression (6) is found. Next, output gradation characteristics are read from the printer profile unit 21, and the input pixel level is corrected so that compressed output lightness $L^{*'}$ can be output.

As described above, by reading input and output characteristics from the monitor profile unit 20 and the printer profile unit 21, finding the relationship of the correction value corresponding to each pixel level, and correcting the RGB value of image data, printing that is automatically matched in gradation with an image displayed on the monitor 11 can be performed when the monitor 11 and settings on paper are changed.

Third Embodiment

A third embodiment of the present invention is a modification of the second embodiment. Differences from the second embodiment are described below.

Figure 9:
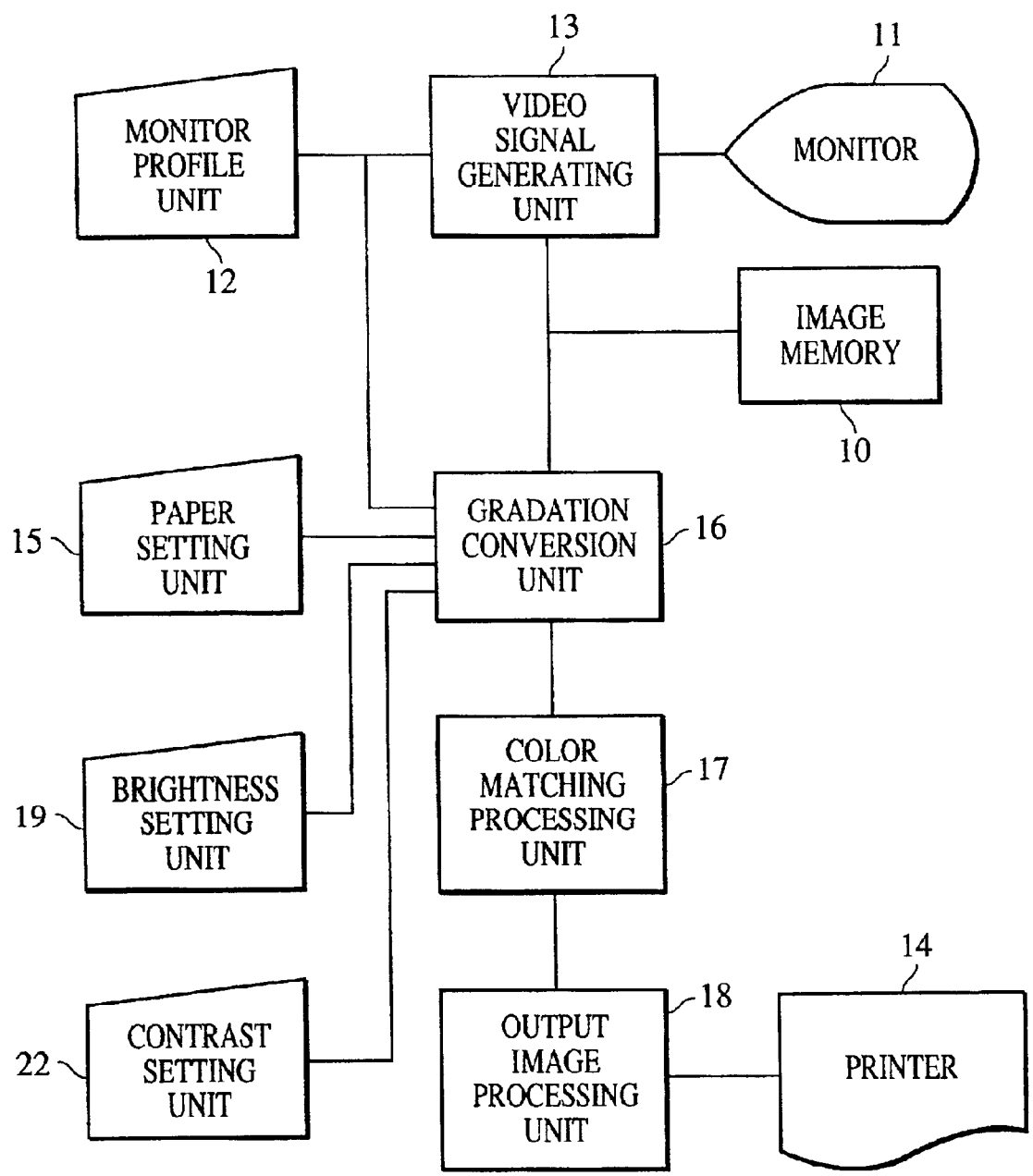
FIG. 9 is a block diagram showing an image processing apparatus according to a third embodiment of the present invention.

FIG. 9 is a block diagram showing an image processing apparatus according to the third embodiment.

The image processing apparatus according to the third embodiment includes a brightness setting unit 19 that sets the lightness of an output image, and a contrast setting unit 22 that controls the contrast of the output image.

A method for controlling lightness and contrast is described below.

A lightness correction value that is set by the brightness setting unit 19 is represented by ΔL. When the set lightness correction value is greater than a standard, ΔL is positive, while when the set lightness correction value is less than the standard, ΔL is negative. A contrast correction value that is set by the contrast setting unit 22 is represented by Δγ. When the set contrast correction value is greater than a standard, Δγ is positive, while when the set contrast correction value is less than the standard, Δγ is negative.

Lightness correction is performed by changing the values of $L_{max}$ and $L_{min}$ in expression (6). When ΔL is positive, the lightness correction is expressed by the following expression (7) in which $L_{min}$ in expression (6) is replaced by $L_{min}+\Delta L$.

$$L_p^* = L_m^*(L_{max}-L_{min}-\Delta L)+L_{min}+\Delta L \quad (7)$$

When ΔL is negative, the lightness correction is expressed by the following expression (8) in which $L_{max}$ in expression (6) is replaced by $L_{max}+\Delta L$.

$$L_p^* = L_m^*(L_{max}+\Delta L-L_{min})+L_{min} \quad (8)$$

Figure 10:
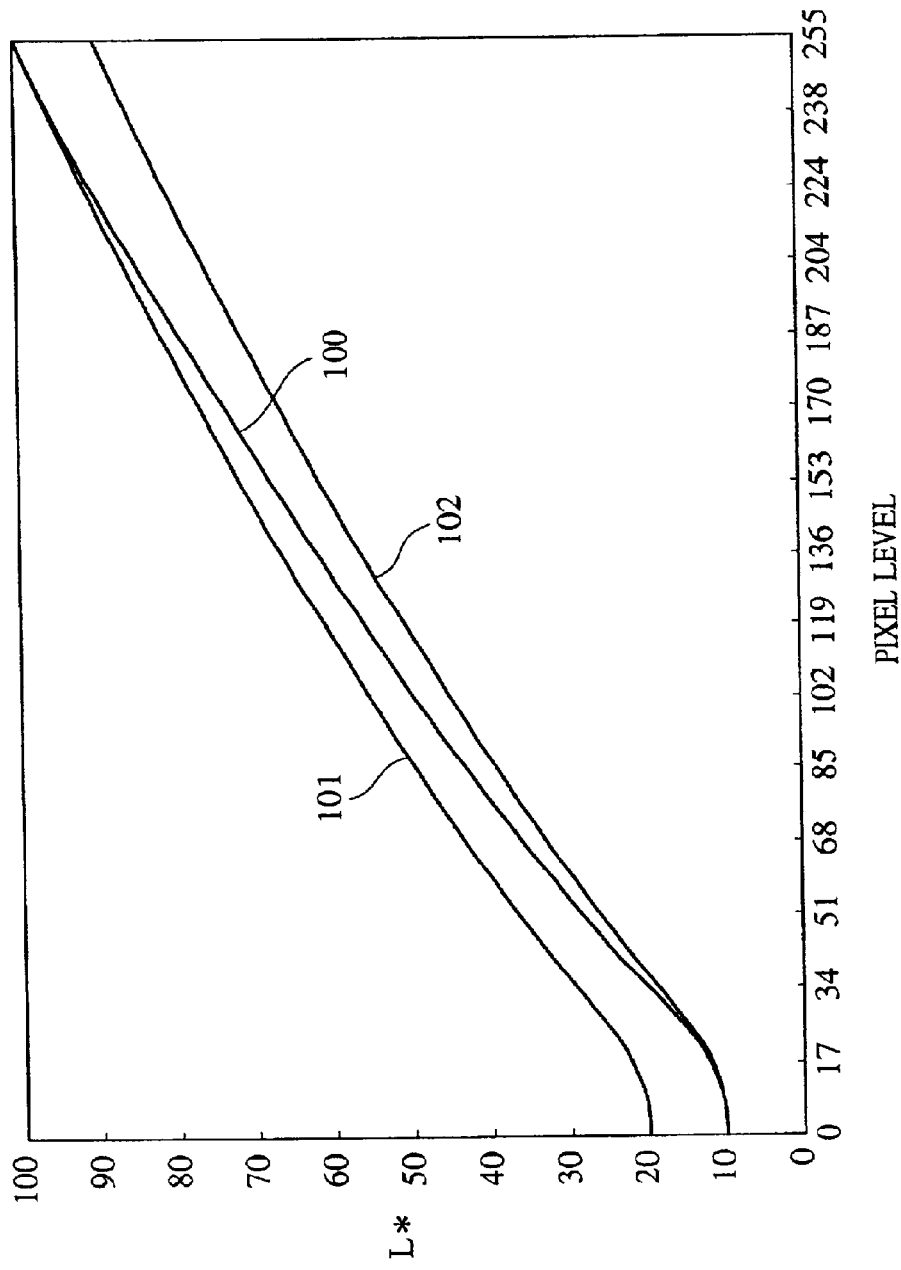
FIG. 10 is a graph showing lightness-corrected gradation characteristics.

FIG. 10 shows the relationship between pixel level I and lightness $L_p^*$ which are obtained when the contrast is corrected. In FIG. 10, concerning lightness $L_p^*$, reference numerals 100, 101, and 102 denote a standard state, a brighter state, and a darker state, respectively.

The contrast correction is performed by increasing or reducing gamma value γ in expression (5). In other words, is the relationship between (input) pixel level I and lightness $L_m^*$ of the contrast-corrected image is expressed by the following expression (9) in which γ in expression (5) is replaced by γ+ΔL.

$$L_{m^*} = 116(I/255)^{(\gamma+\Delta\gamma)/3} - 16 \quad ((I/255)^{(\gamma+\Delta\gamma)} > 0.008856) \quad (9)$$

$$L_{m^*} = 903.29(I/255)^{(\gamma+\Delta\gamma)} \quad ((I/255)^{(\gamma+\Delta\gamma)} > 0.008856)$$

Figure 11:
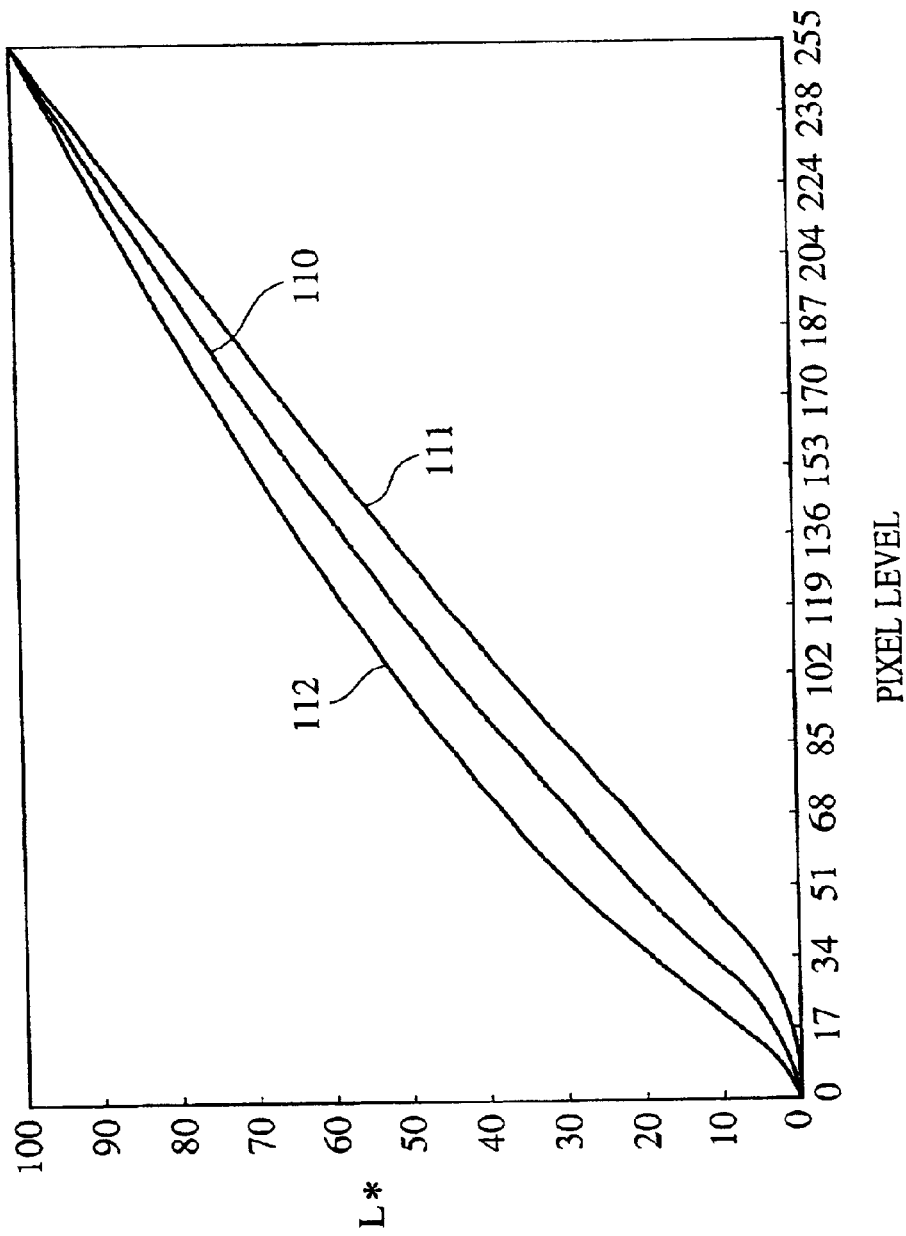
FIG. 11 is a graph showing contrast-corrected gradation characteristics.

FIG. 11 shows the relationship between pixel level I and lightness L* which are obtained when lightness is changed.

Reference numerals 101, 111, and 112 denote a standard state, a high contrast state, and a low contrast state, respectively.

In the third embodiment, in accordance with gamma value γ on the monitor 11 for which gradation matching is performed, which is read from the monitor profile unit 20, the paper type set in the paper setting unit 15, the lightness of the output image which is set in the brightness setting unit 19, and the contrast of the output image which is set in the contrast setting unit 22, the gradation conversion conditions are found by using expressions (7), (8), and (9), and the above interpolation.

Figure 12:
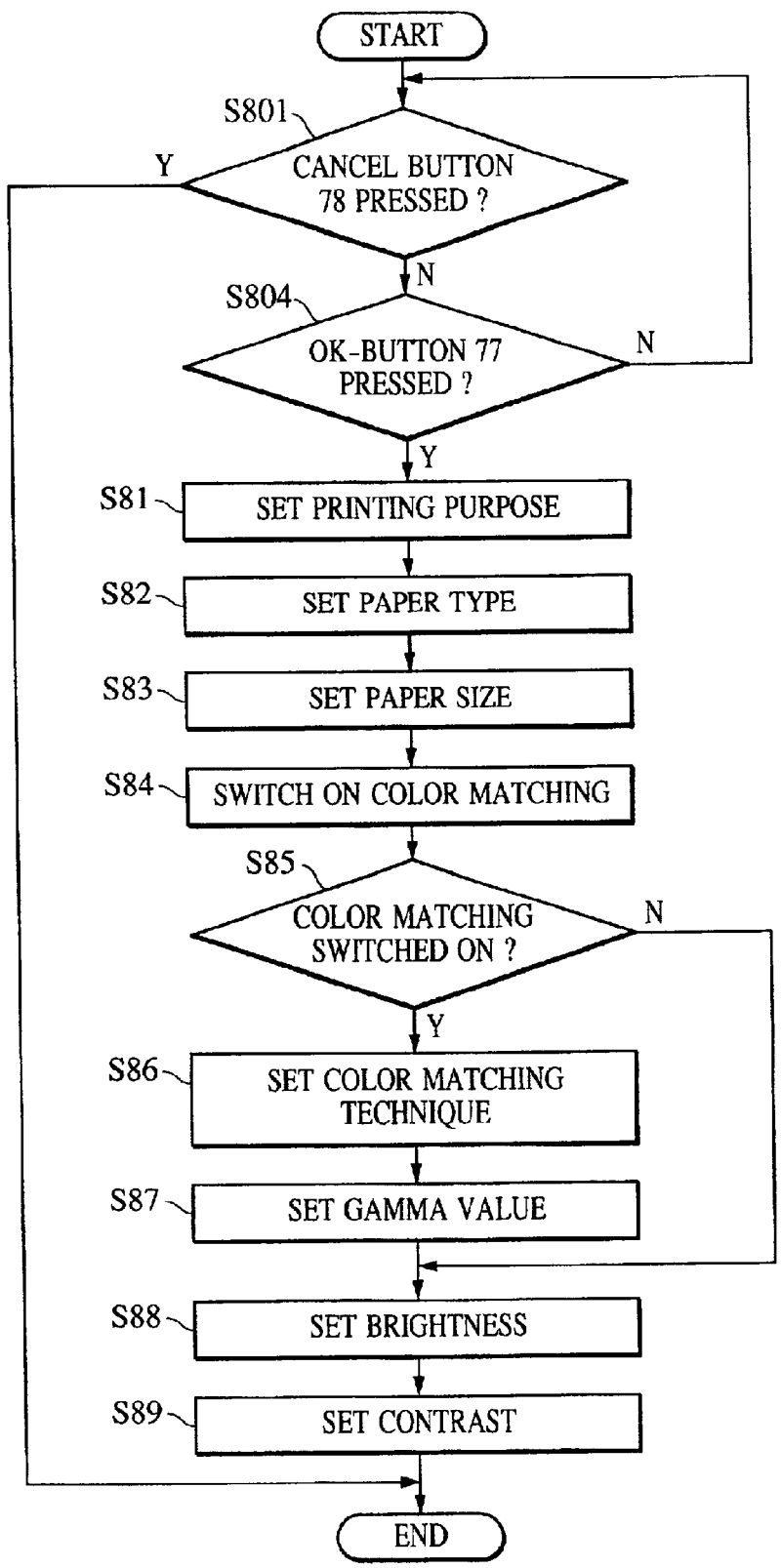
FIG. 12 is a flowchart illustrating a process for setting image-output conditions on a third embodiment of the present invention.
Figure 13:
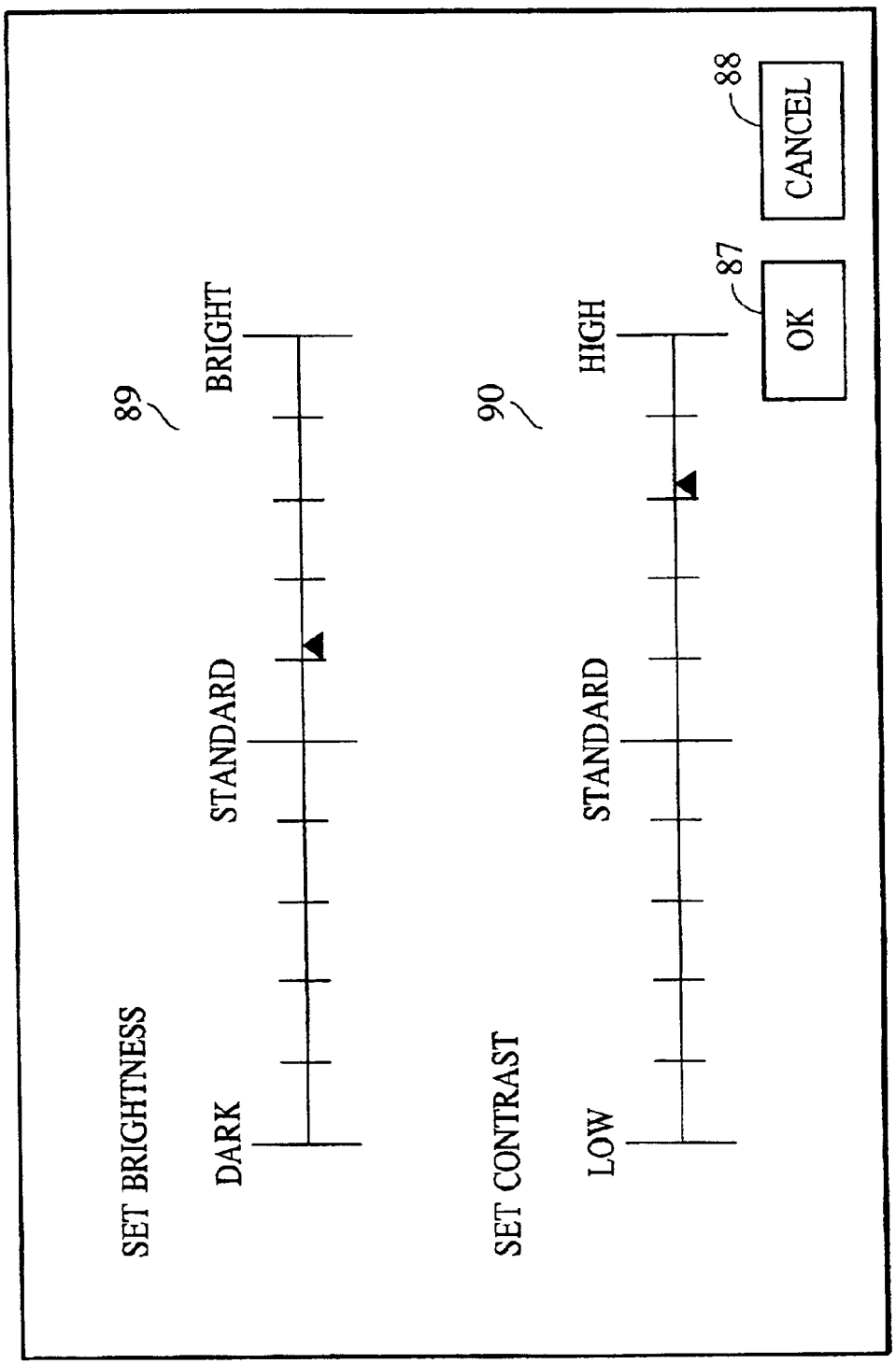
FIG. 13 is a drawing showing an example of a user interface for setting lightness and contrast.

With reference to FIGS. 12 and 13, a process for setting each item by the user interface in the setting of the output conditions is described below.

FIG. 13 shows a form of a printer driver's user interface for setting the lightness and contrast of the output image. In the flowchart in FIG. 12, by using identical reference numerals to denote steps identical to those described in the first embodiment, a description of the steps is omitted.

In step S87, by using an objective gamma setting unit 86 to perform gamma value setting, gamma value $\gamma_p$ on the monitor 11 for gradation matching is performed is acquired. Here, by setting the gamma value γ set in the monitor profile 20, as an initial value in the objective gamma setting unit 86, the initial value can be changed depending on user's preference.

In step S88, in a brightness setting unit 89, the user uses a slider bar to the lightness of the output image. The positional difference of the set position from the standard position is acquired, which corresponds to the above ΔL. In step S89, in a contrast setting unit 90, the user uses a slider bar to set the contrast of the output image. The positional difference of the set position from the standard position is acquired, which corresponds to the above Δγ. After that, the process for setting the output conditions ends.

As described above, by correcting the RGB values of image data after finding the relationship of correction values with respect to pixel levels by associating control of contrast with an increase or decrease in the gamma value of the monitor 11, associating control of lightness with the maximum or minimum lightness of the printer 14, the lightness and contrast of a printing output can be controlled without losing the gradation of an image displayed on the monitor 11. In particular, by performing gradation correction using lightness that is an equal factor with respect to a human sense of luminous intensity, gradation correction close to a visual sense can be performed.

Fourth Embodiment

A fourth embodiment of the present invention is a modification of the third embodiment. Differences from the third embodiment are described below.

Figure 14:
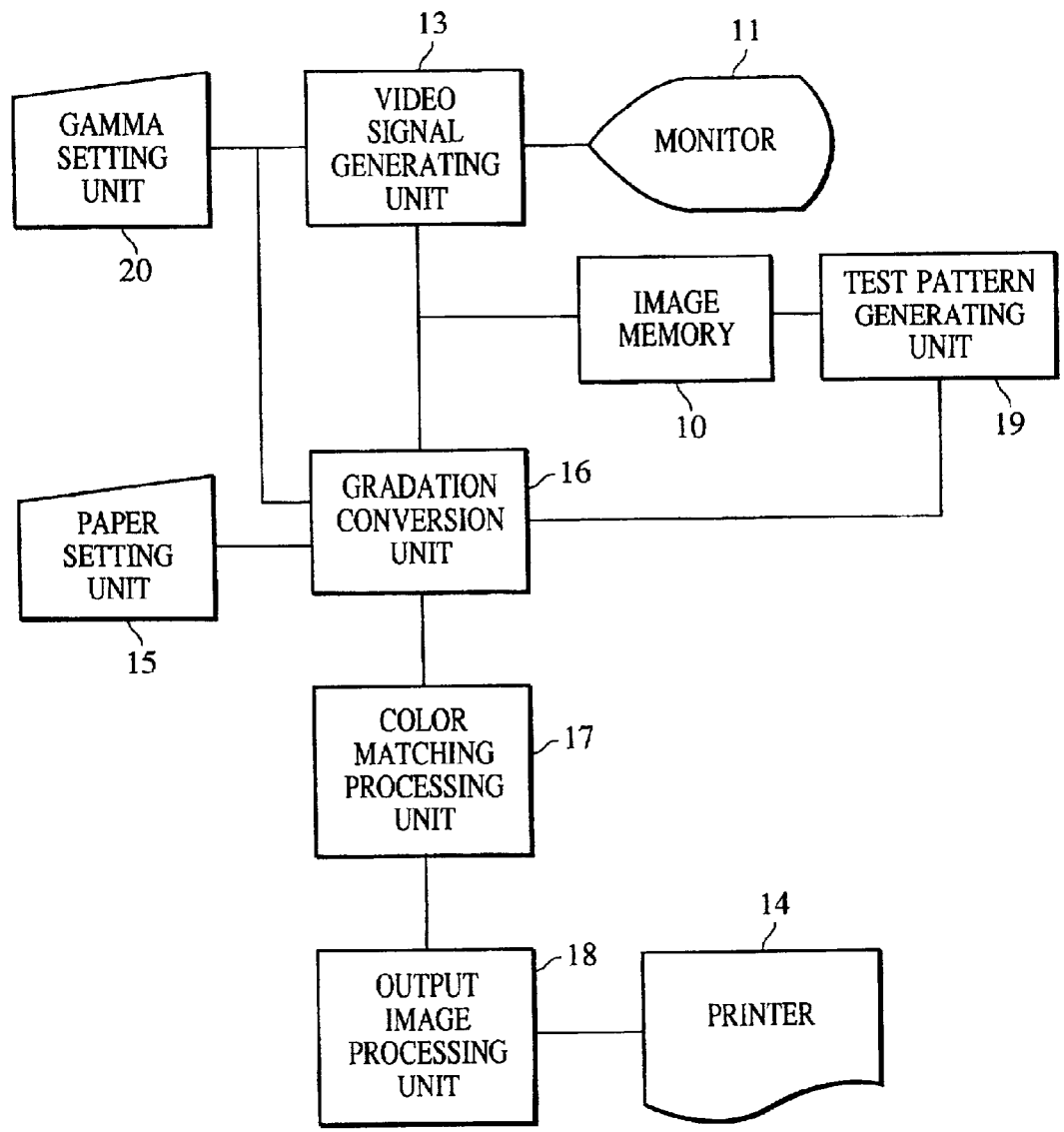
FIG. 14 is a block diagram showing an image processing apparatus according to a fourth embodiment of the present invention.

FIG. 14 is a block diagram showing an image processing apparatus according to the fourth embodiment. This image processing apparatus includes a test pattern generating unit 19 that generates image patterns for gamma-value test.

Gamma value γ in expression (3) changes depending on the characteristics of the monitor 11 and the video signal generating unit 13. Ordinarily, in an inexpensive system such as a personal computer system, the characteristics of a monitor and a video signal generating unit are unknown, or device differences appear even if the characteristics are known. Also, depending on an illumination condition in an environment in which the monitor 11 is viewed, a perceptible lightness changes.

In order to know display characteristics in an environment of use by the user, the image processing apparatus according to the fourth embodiment uses the following method to print several types of test patterns, and compares a displayed test pattern and the printed test patterns. Based on the results of comparison, the gamma value γ (denoted by reference numeral 76 in FIG. 6) of the monitor 11 for which gradation matching is performed is set.

Figure 16:
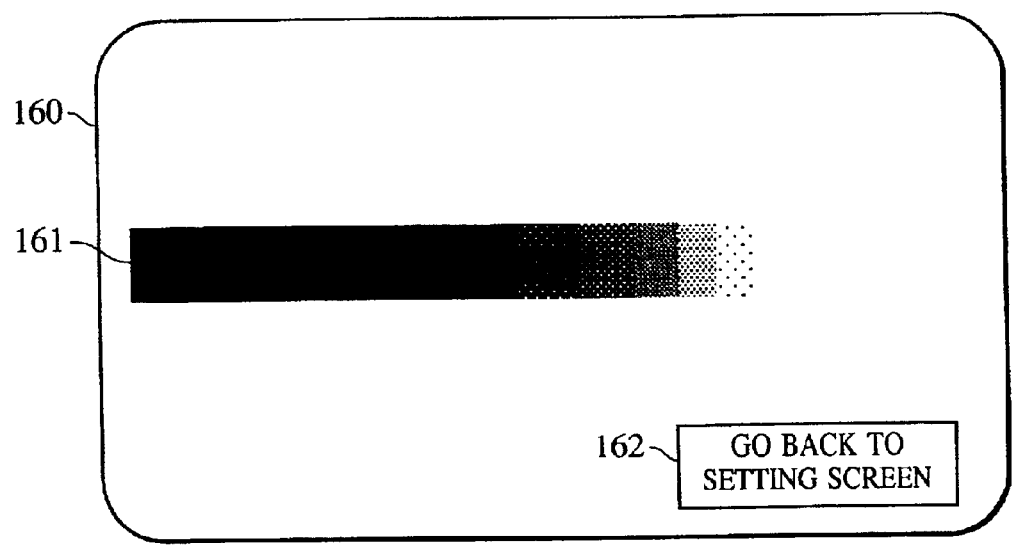
FIG. 16 is a drawing showing an example of a test pattern.

When the gamma value γ of the monitor 11 is set, a gradation example (gradation patch pattern) is generated and stored in the image memory 10 by the test pattern generating unit 19. FIG. 16 shows a gradation pattern 161 (as an example of the gradation pattern) and a button 162 for going back to the screen for setting the output conditions, which are displayed on the screen 160 of the monitor 11.

Figure 17:
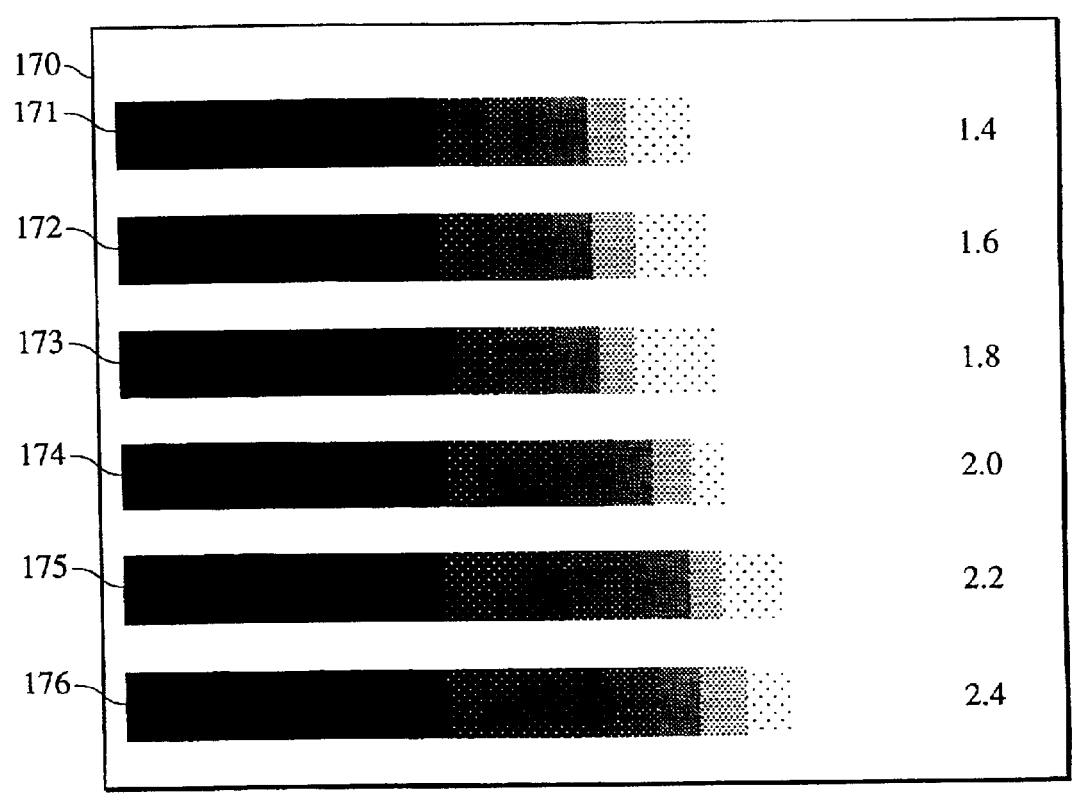
FIG. 17 is a drawing showing examples of printed test patterns.

Next, the printer 14 prints a test pattern. The gradation conversion unit 16 uses several gamma values γ to convert the generated gradation, performs the color matching process and the output image process, and uses the printer 14 to print the obtained image. FIG. 17 shows gradation patterns (as test patterns) 171, 172, 173, 174, 175, and 176 printed on printing paper 170. The gradations of the patterns 171, 172, 173, 174, 175, and 176 are corrected by gamma values $\gamma_p$ of 1.4, 1.6, 1.8, 2.0, 2.2, and 2.4, respectively.

Figure 15:
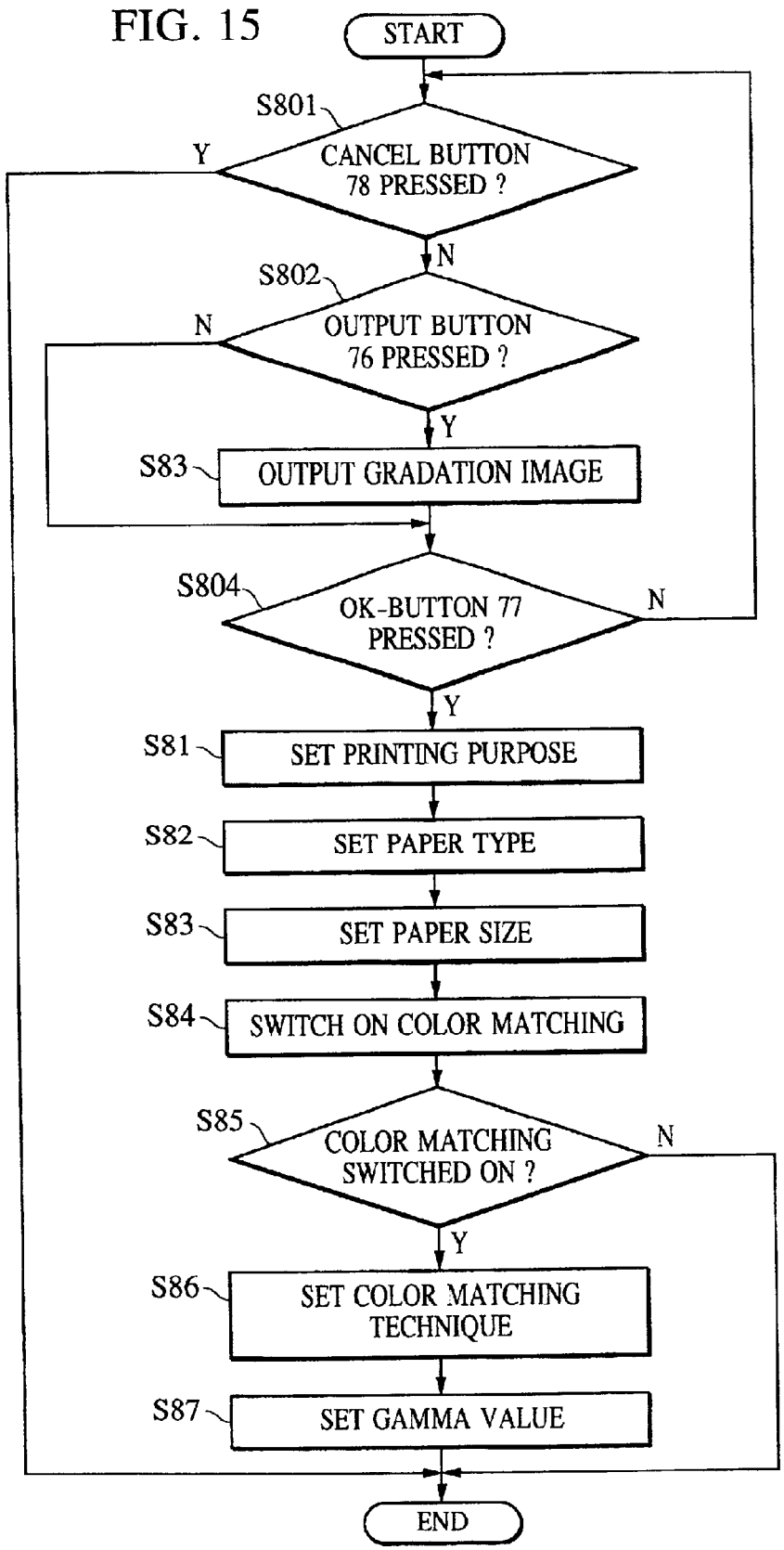
FIG. 15 is a flowchart illustrating a process for setting image-output conditions on a fourth embodiment of the present invention.

With reference to the flowchart shown in FIG. 15, a process for setting each item in the user interface is described below. By using identical reference numerals to denote steps identical to those described in the first embodiment, a description of the steps is omitted.

In step S801, the process determines whether the cancel button 79 is pressed. If the cancel button 79 is pressed, the process ends. If the button 79 is not pressed, the process proceeds to step S802.

In step S802, the process determines whether the button 76 is pressed. If the button 76 is pressed, the process proceeds to step S803. If the button 76 is not pressed, the process proceeds to step S804.

In step S803, the gradation image shown in FIG. 16 is displayed on the monitor 11, and the image shown in FIG. 17 is output from the printer 14. By pressing the "GO BACK TO SETTING SCREEN" button 162 in FIG. 16, the process proceeds to step S804.

In step S804, the process determines whether the OK button 78 is pressed. If the OK button 78 is pressed, the process proceeds to step S81. If the OK button 78 is not pressed, the process goes back to step S801.

According to the fourth embodiment, preferable gradation matching can be performed regardless of device difference and an illumination condition.

Other Embodiments

The present invention may be applied to a system composed of a plurality of apparatuses such as a host computer, an interface apparatus, a reader, and a printer) and to a single apparatus such as a facsimile machine or a facsimile machine.

Obviously, the objects of the present invention can be achieved by providing a system or apparatus with a recording medium containing the program code of software for implementing the functions of the foregoing embodiments, and controlling the computer (or a central processing unit or a microprocessor unit) of the system or apparatus to read and execute the program code from the recording medium.

In this case, the program code read from the recording medium implements the functions of the foregoing embodiments, so that the recording medium containing the program code constitutes the present invention.

For example, a floppy disk, a hard disk, an optical disk, a magneto-optical disk, a CD-ROM, a CD-R, a magnetic tape, a nonvolatile memory, a ROM, etc., can be used as the recording medium for providing the program code.

In addition, by executing the program code read by the computer, the functions of the foregoing embodiments are implemented. Obviously, this also includes a case in which based on the instructions of the program code, an operating system activated on the computer performs part of actual processing, and the processing implements the functions of the foregoing embodiments.

Moreover, the present invention includes a case in which after the program code read from the recording medium is written in a memory provided in an add-in board inserted into the computer or in an add-in unit connected to the computer, a CPU, or the like, which is provided in the add-in board or unit performs, based on the instructions of the program code, all or some of actual processes, and the processing implements the functions of the foregoing embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method for performing gradation matching between images formed by a first output unit and a second output unit which have different gradation-reproduction ranges, said image processing method comprising the steps of:

controlling the first output unit to output a gradation image in accordance with image data representing gradation;

controlling the second output unit to output a plurality of gradation images corresponding to the results of different gradation processes on the image data representing gradation;

inputting information for, from among the plurality of gradation images output from the second output unit, selecting a gradation image corresponding to the gradation image output from the first output unit; and setting gradation conversion conditions for the second output unit by using the selected gradation image as a target.

2. An image processing method according to claim 1, wherein the first output unit is a monitor.

3. An image processing method according to claim 1, wherein each gradation image is a gray scale image.

4. An image processing apparatus for performing gradation matching between images formed by a first output unit and a second output unit which have different gradation-reproduction ranges, said image processing apparatus comprising:

means for controlling the first output unit to output a gradation image in accordance with image data representing gradation;

means for controlling the second output unit to output a plurality of gradation images corresponding to the results of different gradation processes on the image data representing gradation;

input means for inputting information for, from among the plurality of gradation images output from the second output unit, selecting a gradation image corresponding to the gradation image output from the first output unit; and setting means for setting gradation conversion conditions for the second output unit by using the selected gradation image as a target.

5. A recording medium containing a program for implementing an image processing method for performing gradation matching between images formed by a first output unit and a second output unit which have different gradation-reproduction ranges, the program comprising the steps of:

controlling the first output unit to output a gradation image in accordance with image data representing gradation;

controlling the second output unit to output a plurality of gradation images corresponding to the results of different gradation processes on the image data representing gradation;

inputting information for, from among the plurality of gradation images output from the second output unit, selecting a gradation image corresponding to the gradation image output from the first output unit; and setting gradation conversion conditions for the second output unit by using the selected gradation image as a target.

* * * * *